United States Patent
Vander Lind et al.

(10) Patent No.: US 10,507,929 B1
(45) Date of Patent: Dec. 17, 2019

(54) ATTACHED ROCKET PARACHUTE DEPLOYMENT SYSTEM

(71) Applicant: Kitty Hawk Corporation, Mountain View, CA (US)

(72) Inventors: Damon Vander Lind, Oakland, CA (US); Rebecca Mei-ling Li, Cambridge, MA (US)

(73) Assignee: Kitty Hawk Corporation, Palo Alto, CA (US)

( * ) Notice: Subject to any disclaimer, the term of this patent is extended or adjusted under 35 U.S.C. 154(b) by 337 days.

(21) Appl. No.: 15/338,089

(22) Filed: Oct. 28, 2016

(51) Int. Cl.
*B64D 17/72* (2006.01)
*B64D 17/80* (2006.01)

(52) U.S. Cl.
CPC ........... *B64D 17/725* (2013.01); *B64D 17/80* (2013.01)

(58) Field of Classification Search
CPC ...... B64D 17/725; B64D 17/80; B64D 17/62; B64D 17/64; B64D 25/10; B64D 25/12
See application file for complete search history.

(56) References Cited

U.S. PATENT DOCUMENTS

| | | | | |
|---|---|---|---|---|
| 2,610,815 A * | 9/1952 | Smith | .................... | B64D 17/80 244/139 |
| 3,596,856 A * | 8/1971 | Drew | .................... | B64D 17/02 244/145 |
| 4,004,764 A * | 1/1977 | Burklund | ............. | B64D 17/725 244/141 |
| 4,607,814 A | 8/1986 | Popov | | |
| 4,648,568 A * | 3/1987 | Phillips | ................. | B64C 27/006 244/17.13 |
| 4,765,570 A * | 8/1988 | Herndon | ................ | B64D 25/10 244/122 AE |
| 5,409,187 A | 4/1995 | Dunham | | |
| 6,682,017 B1 * | 1/2004 | Giannakopoulos | .... | B64D 17/80 244/138 R |
| 9,981,749 B1 * | 5/2018 | Swan | .................... | B64D 17/725 |
| 10,099,792 B1 * | 10/2018 | Swan | .................... | B64D 17/80 |
| 2016/0280380 A1 * | 9/2016 | Fourie | ...................... | B64D 1/12 |
| 2018/0011487 A1 * | 1/2018 | Robertson | ............ | G05D 1/0061 |

* cited by examiner

*Primary Examiner* — Valentina Xavier
(74) *Attorney, Agent, or Firm* — Van Pelt, Yi & James LLP

(57) ABSTRACT

A parachute deployment system is disclosed. In various embodiments, a parachute is tethered to an aircraft. A self-propelled projectile is tethered to the parachute. The self-propelled projectile is configured to be launched in a trajectory away from the aircraft. Once launched, the self-propelled projectile pulls the parachute taut in one dimension.

18 Claims, 7 Drawing Sheets

ATTACHED ROCKET PARACHUTE DEPLOYMENT SYSTEM

BACKGROUND OF THE INVENTION

In many aviation applications there is a need for a recovery system that can reduce damage to people or property in the case of a total system failure. Existing recovery parachute systems have untenably long deployment times or untenably high masses. A good solution to the problem reduces deployment time by putting the parachute into a state in which it more quickly inflates and begins to slow the vehicle.

BRIEF DESCRIPTION OF THE DRAWINGS

Various embodiments of the invention are disclosed in the following detailed description and the accompanying drawings.

DETAILED DESCRIPTION

Figure 1:
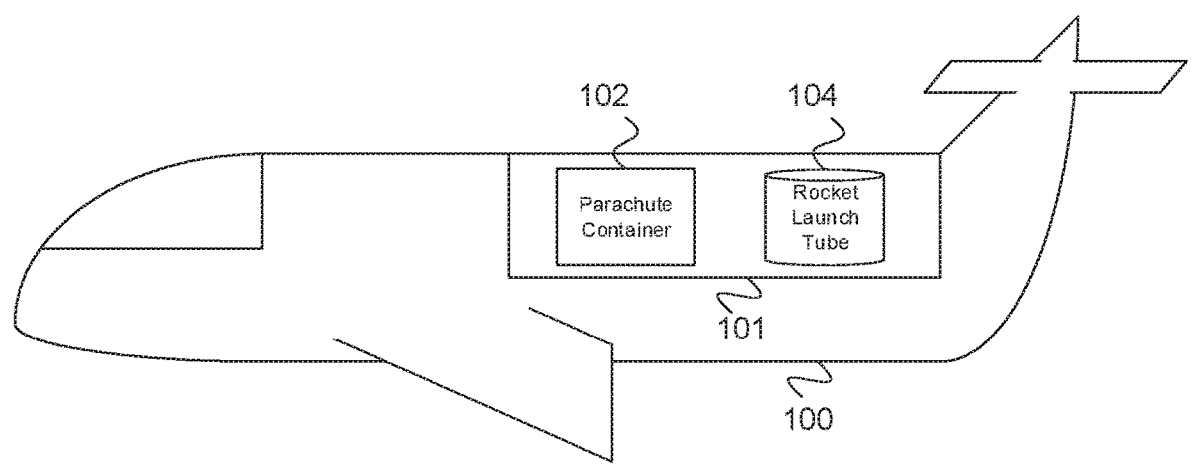
FIG. 1 is a diagram illustrating an embodiment of an aircraft comprising an attached rocket parachute deployment system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A parachute deployment system is disclosed. The parachute deployment system comprises a parachute tethered to an aircraft. A self-propelled projectile is tethered to the parachute and configured to be launched in a trajectory away from the aircraft. The self-propelled projectile pulls the parachute taut in one dimension. In some embodiments, the projectile is tethered to an end of the parachute opposite from the aircraft or at the top of the parachute. The trajectory may include a component in a direction opposite a direction the aircraft is traveling.

A rocket may be connected to a parachute via a tether. The rocket may deploy upwards away from an aircraft in order to deploy the parachute. The aircraft may be falling downwards towards ground. In some embodiments, the parachute is packed inside a container. The container may open when the container is pulled a predetermined distance from the aircraft, exposing the parachute. In some embodiments, the container is attached to a part of the vehicle and the parachute may be extracted prior to exiting the vehicle. The rocket may pull the parachute taut in a vertical direction, allowing the parachute to fill with air quickly. The rocket may pull the parachute sufficiently far before detaching such that the parachute is soon after pulled taut. Suspension lines of the parachute may be tensioned by the rocket for quicker parachute deployment.

FIG. 1 is a diagram illustrating an embodiment of an aircraft comprising an attached rocket parachute deployment system. In the example shown, aircraft 100 includes attached rocket parachute deployment system 101. The system may be used to recover an aircraft or any other appropriate airborne object. System 101 may be used to deploy a parachute in the event aircraft 100 cannot be safely landed. Attached rocket parachute deployment system 101 includes parachute container 102 and rocket launch tube 104. In some embodiments, parachute container 102 and rocket launch tube 104 are attached externally to aircraft 100. In some embodiments, parachute container 102 and rocket launch tube 104 are stored within aircraft 100. A rocket launched from tube 104 may break a window or surface of the aircraft when the parachute is deployed. Parachute container 102 and rocket launch tube 104 may be stored within a compartment in aircraft 100 that is isolated from the rest of the aircraft. The parachute and rocket may be stored with a form of separation to prevent the rocket from ripping or burning the parachute sack.

Figure 2:
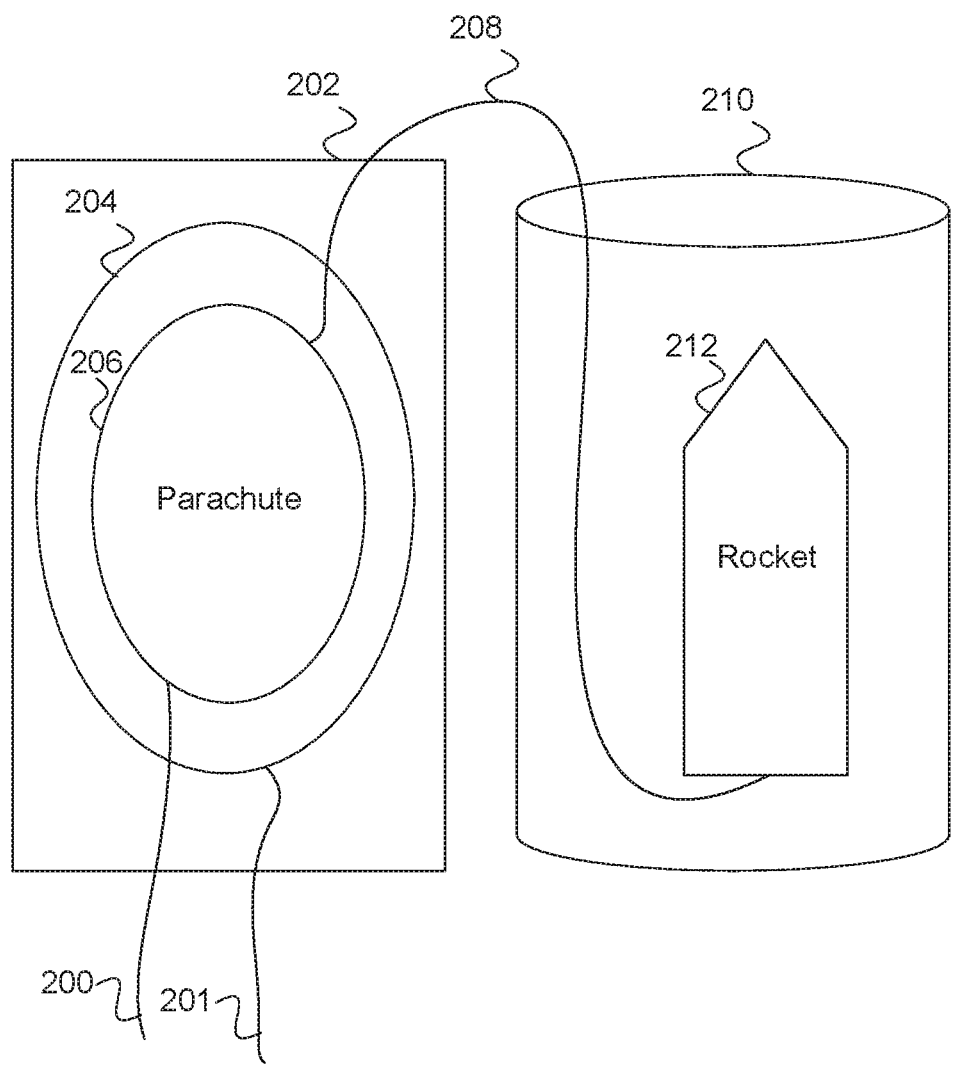
FIG. 2 is a diagram illustrating an embodiment of an attached rocket parachute deployment system.

FIG. 2 is a diagram illustrating an embodiment of an attached rocket parachute deployment system. The parachute has not been deployed. In the example shown, parachute container 202 includes parachute bag 204. Parachute container 202 may comprise a basket or any appropriate container. The container may be smooth as to prevent snagging the parachute. For example, the parachute may be stored in a tube that has a height twice the parachute's diameter. The rocket may be stored next to the tube. Parachute 206 is stored within parachute bag 204. Parachute 206 may be folded such that it opens smoothly during extraction. Parachute lines may be combed and folded in a zig-zag configuration to prevent tangling. The parachute lines may be secured in groups using rubber bands or other mechanisms that break or slide off as the parachute is deployed. Tether 200 is attached to parachute 206 and extends through parachute bag 204 and parachute container 202. In some embodiments, tether 200 attaches parachute 206 to an aircraft. Tether 200 may connect to a bridle of the aircraft. The sack may be tethered to an object or aircraft the parachute is used to recover. Tether 201 connects parachute sack 204 to an aircraft or object.

Tether 208 attaches rocket 212 to parachute 206. Tether 208 passes through parachute bag 204 and parachute container 202. A tether attaching the self-propelled projectile to the parachute may traverse the sack. A tether attaching the parachute to the object may traverse the sack. The attachment tether may be sufficiently long such that the self-propelled projectile, upon burning out or otherwise running out of impulse, does not land on and burn the parachute canopy. One or more holes or openings may exist in parachute bag 206 and parachute container 202 wherein tethers may pass through. Rocket 212 is stored within rocket launch tube 210. Rocket 212 may be surrounded in an insulating material. The rocket may be kept within a fiberglass capsule. Rocket 212 may be insulated such that in the event it lands on a flammable surface, such as grass, a fire will not result. In some embodiments, the parachute sack and rocket are contained in one container.

Figure 3A:
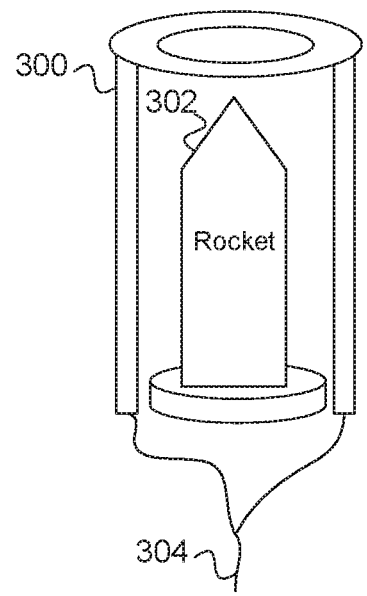
FIG. 3A is a diagram illustrating an embodiment of a rocket of an attached rocket parachute deployment system before deployment.

FIG. 3A is a diagram illustrating an embodiment of a rocket of an attached rocket parachute deployment system before deployment. The figure shown may be stored within rocket launch 210 of FIG. 2 prior to deployment. In some embodiments, a projectile of the system includes a hollow outer cylindrical component or hollow outer container. The projectile may be stored within the cylindrical component prior to deployment. An end of the cylindrical component may have an opening smaller than a base of the projectile. The projectile may be configured to deploy through the opening at the end of the cylindrical component. During deployment, the base of the projectile may be located inside the cylindrical component and a nose of the projectile may protrude outside of the cylindrical component. The opening of the outer container may snag on the base of the projectile, causing the outer container to be towed behind the projectile.

In the example shown, rocket 302 is stored inside of frame 300. Rocket 302 is stored with its top near the top of frame 300. Rocket 302 has a circular base. As shown, frame 300 has a circular opening at its top end and two poles attached to the circular opening, creating a cylindrical frame. The bottom end of frame 300 is attached to tether 304. In the example shown, tether 304 is attached to the two poles of frame 300. Tether 304 may attach the frame to an aircraft. In some embodiments, frame 300 is a solid cylinder with openings at both ends. Frame 300 may be composed of an insulating material. Frame 300 may be a rectangular prism, a tapered cylinder, or any appropriate shape. The base of rocket 302 may be any appropriate shape. The base of rocket 302 and frame 300 may have interlocking pieces.

Figure 3B:
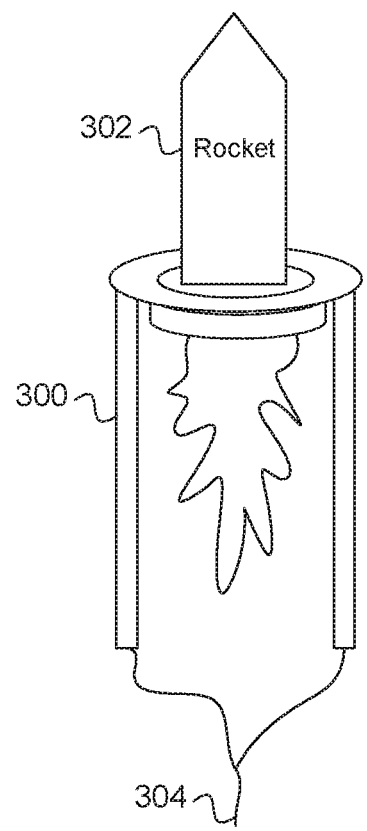
FIG. 3B is a diagram illustrating an embodiment of a rocket of an attached rocket parachute deployment system during deployment.

FIG. 3B is a diagram illustrating an embodiment of a rocket of an attached rocket parachute deployment system during deployment. As shown, rocket 302 has deployed through the opening near the top of frame 300. The base of rocket 302 is wider than the opening of frame 300, causing the rocket to be lodged near the top of frame 300. Rocket 302 may burn fuel as it deploys, causing a flame to be generated. In the example shown, frame 300 prevents the flame from reaching tether 304. Frame 300 may be shaped and composed in order to protect tether 304 and the attached parachute or parachute bag from heat generated by rocket 302. Tether 304 may be flammable, causing the rocket to become detached from the aircraft in the event flames were able to reach tether 304.

In various embodiments, the projectile is configured to prevent flames or heated elements from interfering with a tether attaching the projectile to an aircraft. An intermediary object may attach the tether to the projectile.

Figure 4:
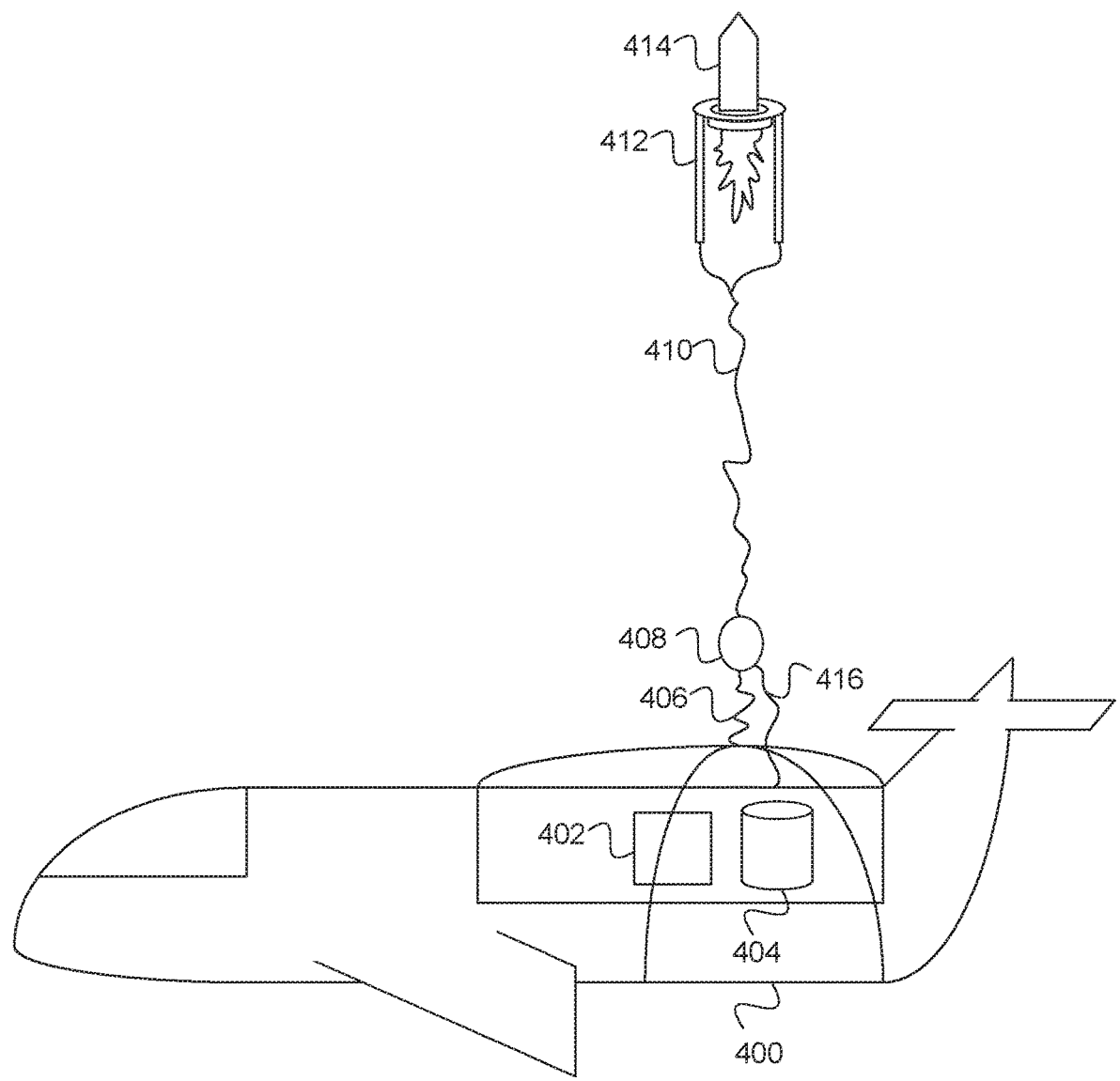
FIG. 4 is a diagram illustrating an embodiment of an attached rocket parachute deployment system during deployment of a parachute bag.

FIG. 4 is a diagram illustrating an embodiment of an attached rocket parachute deployment system during deployment of a parachute bag. In some embodiments, the attached rocket parachute deployment system is triggered in the event an aircraft experiences an emergency. A parachute may be deployed to recover the aircraft. A rocket may be deployed. The rocket may pull out a parachute bag, wherein a parachute initially remains contained within the parachute bag. The parachute bag or sack may be configured to open when it is a predetermined distance above the aircraft. The predetermined distance may be equal to a length of a tether connecting the sack to the aircraft. Extracting the parachute bag while keeping the parachute contained initially may prevent the parachute from becoming caught on the aircraft.

In the example shown, an attached rocket parachute deployment system is used to recover aircraft 400. Rocket 414 has been deployed from rocket launch tube 404. Rocket 414 is deployed perpendicular to aircraft 400 in a direction opposite a direction of the aircraft's fall. In some embodiments, rocket 414 is deployed at an angle based on environmental conditions such as wind or obstacles in the path of the aircraft. The rocket may be deployed at an angle with an upwards component based on the aircraft's current direction or a desired landing location. The angle may have an upwards component. Rocket 414 tows frame 412. Frame 412 is attached to a parachute stored within parachute bag 408 via tether 410. Parachute bag 408 may be pulled out of parachute container 402 via tether 410. The parachute within parachute bag 408 is attached to aircraft 400 via bridle 406. In some embodiments, the bridle is situated towards the front of the aircraft in order to land the aircraft nose first. The bridle may be attached to the aircraft at structurally significant or secure points on the aircraft's frame. Tether 416 attaches parachute bag 408 to aircraft 400. In the example shown, tethers 410, 406, and 416 are slack. The tethers are not fully tensioned.

Figure 5:
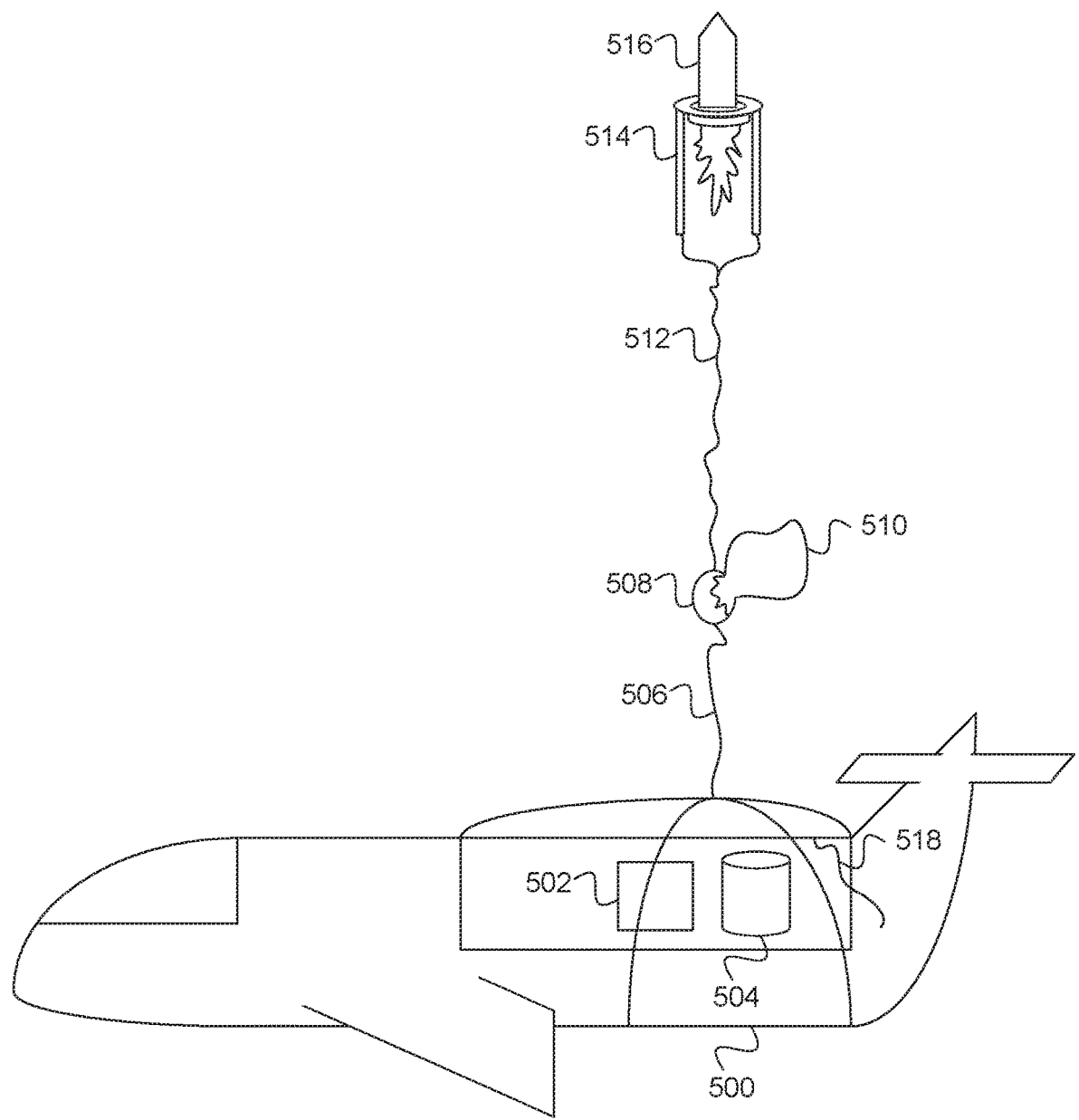
FIG. 5 is a diagram illustrating an embodiment of an attached rocket parachute deployment system during initial stages of parachute deployment.

FIG. 5 is a diagram illustrating an embodiment of an attached rocket parachute deployment system during initial stages of parachute deployment. In some embodiments, as rocket 510 travels upwards, the tether attaching the parachute bag to the aircraft breaks under the tension. The tether may detach from the parachute bag when it is pulled taut or when the parachute bag is a distance from the aircraft equal to the tether length. The tether may hold the parachute bag together such that detaching the tether causing the parachute bag to open, releasing the parachute. In the example shown, tether 518 has detached from parachute bag 508. In some embodiments, the tether is woven into a seam of the parachute bag such that the parachute bag unravels when the tether is taut. A cord may be looped through the parachute bag, holding the bag together. The tether may be looped through the cord such that a strong tug on the tether causes the tether to come loose, releasing the cord. The parachute bag may be split open when tether 518 is taut.

In the example shown, parachute 510 is partially outside of parachute sack 508. Parachute sack 508 may be detached from all components of the aircraft and recovery system. In some embodiments, the parachute sack remains tethered to the aircraft when it is split open. Parachute 510 has not taken the full load of aircraft 500. The tether of bridle 506 is slack. Parachute container 502 and rocket launch tube 504 remain empty. In some embodiments, the system progress from the figure of FIG. 5 to the figure of FIG. 6 quickly because the rocket quickly pulls the parachute out once the parachute sack is compromised.

In some embodiments, the parachute is extracted directly from a sack or container in the vehicle. The sack may not exit the vehicle or be towed by the rocket before it opens and the parachute is extracted. The added time during which the parachute is extracted from the sack may allow a greater volume of air to enter the parachute and reduce fill time. In some embodiments, an opening or vent hole in the top of the parachute may be configured to allow air to enter the parachute as the parachute is towed away from the container by the rocket. The bottom of the parachute may be configured to maintain a certain minimum open area as the parachute is towed such that the parachute has a greater ability to entrap air. For example, the bottom of the parachute may include a rigid or spring loaded frame.

In some embodiments, the rocket remains attached to the parachute in order to tighten the parachute or pull the parachute taut. In some embodiments, the rocket detaches or cuts away from the parachute after the parachute is extracted but before the parachute is pulled taut. The rocket may pull the parachute sufficiently in a vertical direction before detaching such that the parachute and/or aircraft's acceleration are sufficient to pull the parachute taut. The rocket's trajectory may depend on vehicle flight speed or any other appropriate parameter that determines parachute load.

Figure 6:
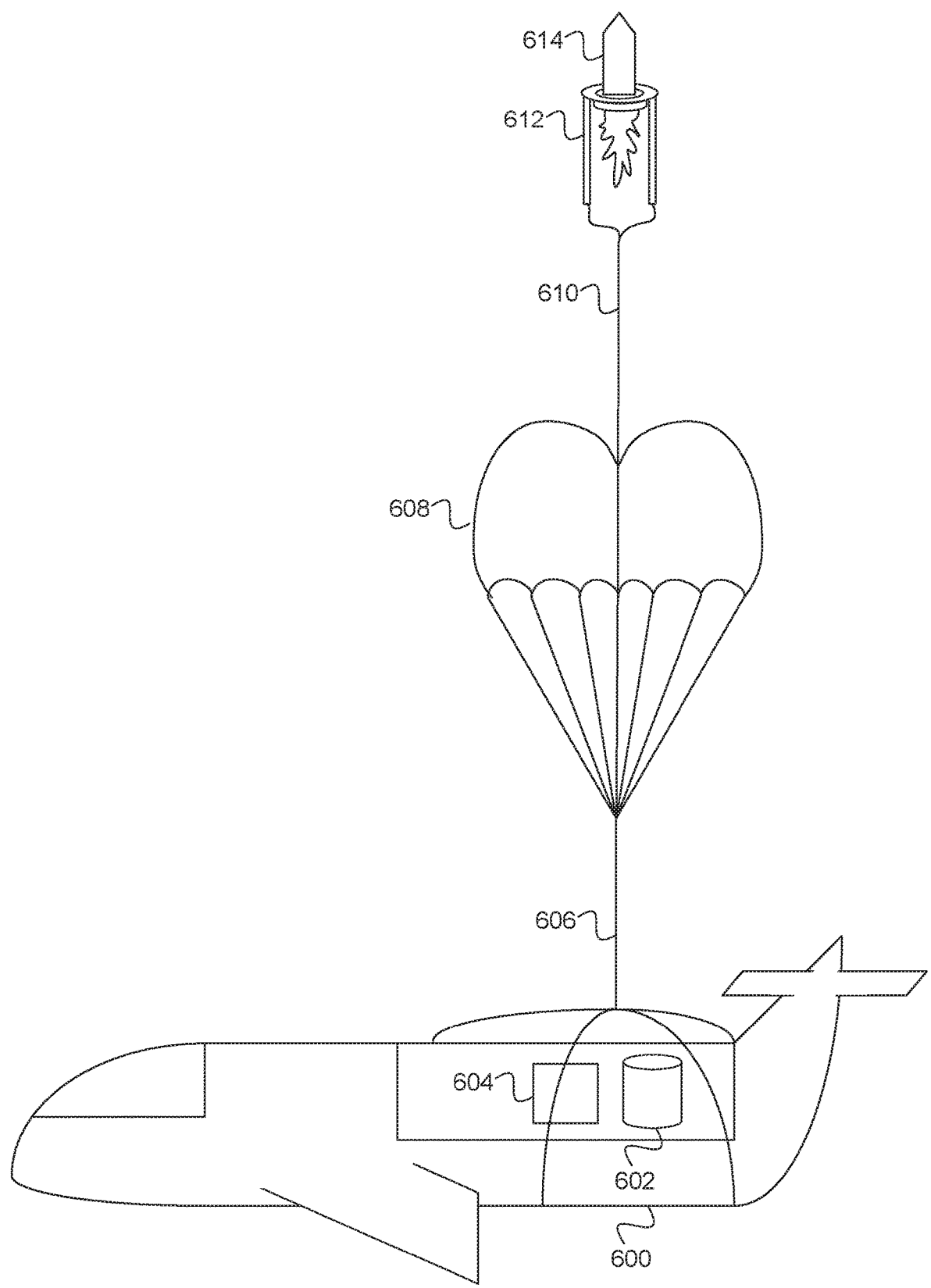
FIG. 6 is a diagram illustrating an embodiment of an attached rocket parachute deployment system during parachute deployment.

FIG. 6 is a diagram illustrating an embodiment of an attached rocket parachute deployment system during parachute deployment. In the example shown, the parachute bag has detached and has blown away. In some embodiments, the tether attaching the parachute bag to the aircraft may be loosely secured to the aircraft and become detached. In the example shown, rocket 614 has reached its maximum distance from aircraft 600. Rocket 614 tows frame 612. Tether 610 attaching frame 612 to parachute 608 is pulled taut. Rocket 614 may pull parachute 608 taut in one dimension. In some embodiments, extending the parachute fully in one axis using the rocket allows the parachute to fill rapidly. For example, parachute 608 is quickly unpacked in the vertical direction, allowing air to rush in from the bottom of parachute 608 and fill it in the horizontal direction. Parachute 608 is pulled upwards at the top of the parachute by tether 610. The tether connected to bridle 606 is also pulled taut.

In some embodiments, multiple rockets tow the parachute upwards. Once the parachute is pulled taut vertically, the rockets may travel outwards from a center point of the parachute. The trajectory of the rockets may cause the parachute to widen and fill with air.

The parachute deployment system may allow a parachute to deploy more quickly than a system wherein self-propelled projectiles are absent. The attached rocket parachute deployment system may deploy a parachute more quickly than a system wherein a projectile is attached to a parachute container rather than the parachute itself. Systems wherein the projectile is attached to the parachute container may take a longer time to deploy the parachute because the parachute is folded and compact for a longer time. Attaching a projectile to the parachute may pull the parachute out rather than depend on gravity and wind to straighten the parachute. Quickly tensioning the parachute in one dimension may allow the parachute to unfold quickly. The system may allow an aircraft to be recovered at lower altitudes.

Figure 7:
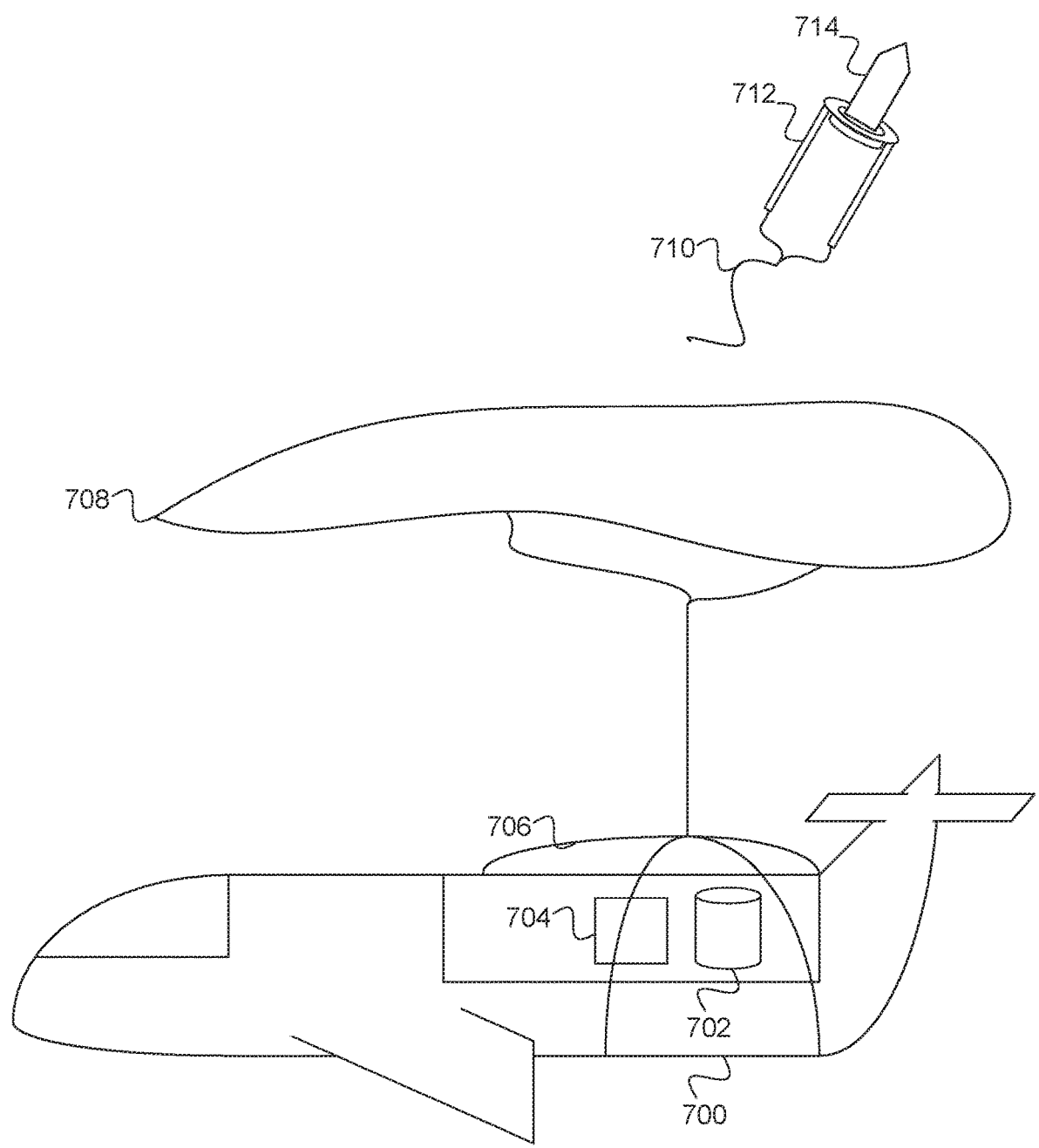
FIG. 7 is a diagram illustrating an embodiment of an attached rocket parachute deployment system after parachute deployment.

FIG. 7 is a diagram illustrating an embodiment of an attached rocket parachute deployment system after parachute deployment. In the example shown, parachute 708 is fully deployed. Parachute 708 may fill with air from below, causing the parachute to take on a wide shape. Parachute 708 may take on the full load of aircraft 700. Parachute 708 is tethered to aircraft 700 via bridle 706. In some embodiments, the projectile is configured to detach from the parachute. In the example shown, rocket 714, frame 712, and tether 710 have detached from parachute 708. As the parachute fully inflates and widens, tether 710 may detach from the parachute due to the seaming or specific method of attachment. In some embodiments, rocket 714 detaches when the rocket has consumed all its fuel and no longer creates a flame. For example, the rocket may burn a structural attachment point once the fuel is extinguished. The rocket may detach after a timing fuse has burned. The rocket may include its own parachute to help it travel away from the aircraft after detachment. In some embodiments, the self-propelled projectile does not detach. Once all of the fuel has burned, the rocket may be of negligible weight. The rocket may remain atop the parachute.

In some embodiments, multiple parachutes are deployed. The multiple parachute may be deployed simultaneously or at different times. Each parachute of the multiple parachutes may comprise a rocket and utilize the attached rocket parachute deployment system. In some embodiments, parachutes of the system are relatively small in size. Parachute tethers of the system may be relatively short. The parachute and tether sizes may allow the one or more parachutes of the system to be deployed quickly.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A parachute deployment system, comprising:
a parachute tethered to an aircraft; and
a self-propelled projectile tethered to the parachute and configured to be launched in a trajectory away from the aircraft, wherein the self-propelled projectile pulls the parachute taut in one dimension, the self-propelled projectile comprises a hollow outer cylindrical component, and an end of the cylindrical component has an opening smaller than a base of the self-propelled projectile.

2. The system of claim 1, wherein the self-propelled projectile pulls the parachute taut in a vertical direction away from the aircraft.

3. The system of claim 1, wherein the self-propelled projectile tensions suspension lines of the parachute.

4. The system of claim 1, wherein the self-propelled projectile is tethered at an end of the parachute opposite from the aircraft.

5. The system of claim 1, wherein the trajectory includes a component in a direction opposite from a direction the aircraft is traveling.

6. The system of claim 1, wherein the parachute is packed inside a container.

7. The system of claim 6, wherein a tether attaching the self-propelled projectile to the parachute or a tether attaching the parachute to the aircraft traverses the container.

8. The system of claim 6, wherein the container is tethered to the aircraft.

9. The system of claim 6, wherein the container is configured to open when the container is a predetermined distance above the aircraft.

10. The system of claim 9, wherein the predetermined distance is equal to a length of a tether connecting the container to the aircraft.

11. The system of claim 6, wherein the container is configured to open.

12. The system of claim 1, wherein the self-propelled projectile is configured to detach from the parachute.

13. The system of claim 1, wherein a base of the self-propelled projectile is wider than a nose of the self-propelled projectile.

14. The system of claim 1, wherein an end of the cylindrical component opposite the end of the cylindrical component that has an opening smaller than a base of the self-propelled projectile is tethered to the parachute.

15. The system of claim 1, wherein the self-propelled projectile is configured to deploy through the opening at the end of the cylindrical component.

16. The system of claim 15, wherein the base of the self-propelled projectile is inside the cylindrical component and a nose of the self-propelled projectile protrudes outside of the cylindrical component during deployment.

17. The system of claim 1, wherein the self-propelled projectile is surrounded with an insulating material.

18. The system of claim 1, wherein the self-propelled projectile is placed within a fiberglass capsule.

\* \* \* \* \*